S. INMAN.
Provision-Safe.
No. 215,362. Patented May 13, 1879.
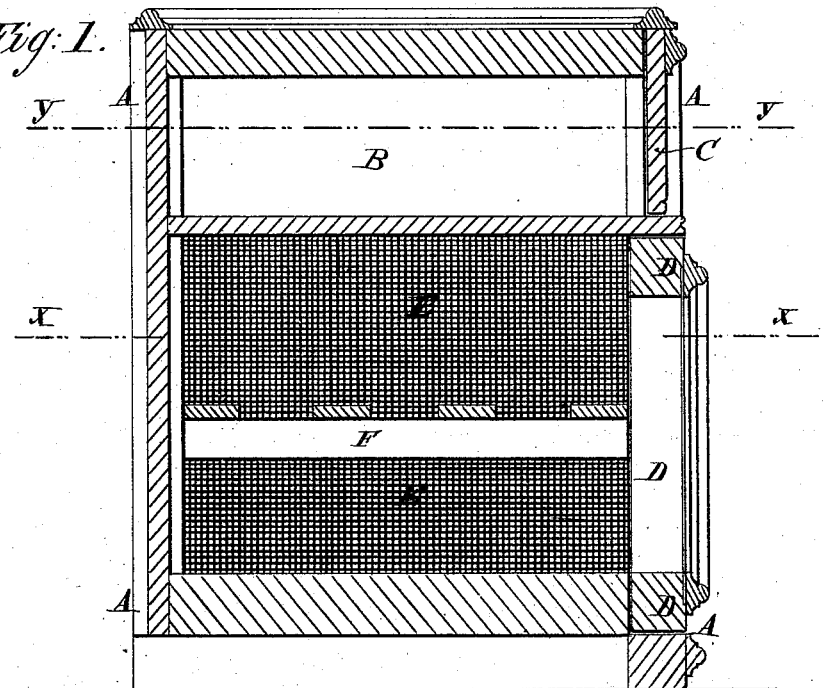
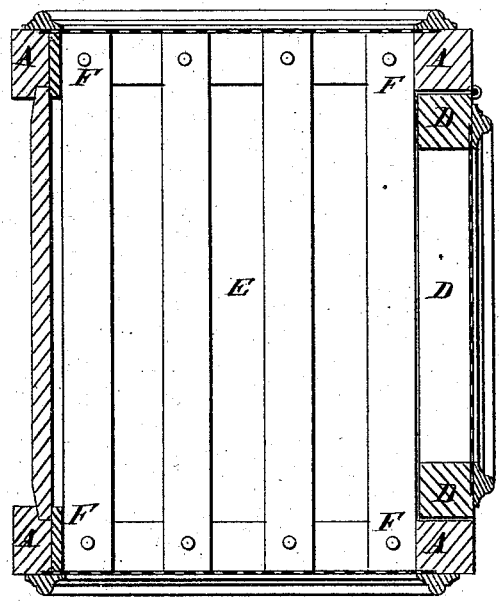
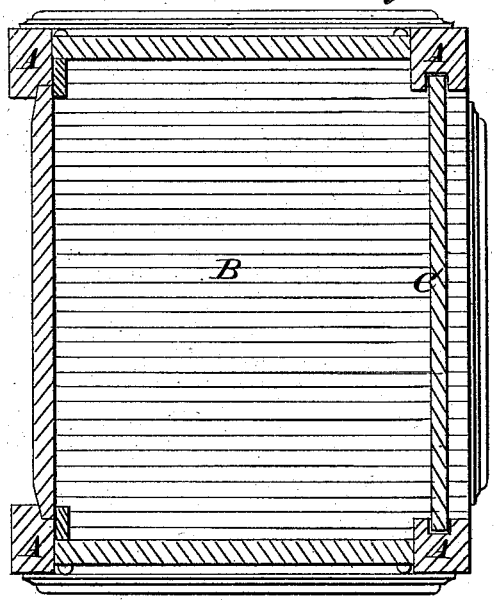
WITNESSES:
Achilles Schehl.
C. Sedgwick
INVENTOR:
S. Inman
BY Munn & Co
ATTORNEYS.

UNITED STATES PATENT OFFICE.

SAMUEL INMAN, OF CHICAGO, ILLINOIS.

IMPROVEMENT IN PROVISION-SAFES.

Specification forming part of Letters Patent No. 215,362, dated May 13, 1879; application filed April 10, 1879.

*To all whom it may concern:*

Be it known that I, SAMUEL INMAN, of Chicago, in the county of Cook and State of Illinois, have invented a new and useful Improvement in Provision-Safes, of which the following is a specification.

Figure 1 is a vertical section of my improved safe. Fig. 2 is a horizontal section of the same taken through the line $x\ x$, Fig. 1. Fig. 3 is a horizontal section of the same taken through the line $y\ y$, Fig. 1.

Similar letters of reference indicate corresponding parts.

The object of this invention is to furnish an improved safe for keeping bread, cake, and other pastry, meats, milk, butter, &c., and which shall be simple in construction and convenient and effective in use.

The invention consists in an improved provision-safe formed of a frame the upper part of which is made with air-tight sides and an air-tight sliding door, and the lower part with wire-gauze sides, and provided with shelves made of slats, and with a door, as hereinafter fully described.

A represents the frame of the box, in the upper part of which is formed a compartment, B, which is made with close air-tight sides and an air-tight sliding door, C.

The lower part of the safe is made with wire-gauze sides, and is provided with a door, D, having a wire-gauze panel. The lower part of the safe is divided into compartments E by shelves or racks F, made of slats, so that the air may circulate freely through the said compartments.

The air-tight compartment B is designed to receive bread, cake, and other pastry, and will prevent them from becoming stale and dry, and the lower compartments, E, are designed to receive meats, butter, milk, cheese, &c., and will protect them from rats, mice, insects, &c., while allowing the air to circulate around them freely. The safe may be set upon a cellar-floor or hung up, as may be most convenient.

Having thus described my invention, I claim as new and desire to secure by Letters Patent—

An improved provision-safe formed of the frame A, the upper part, B, made with air-tight sides, and an air-tight sliding door, C, and the lower part, E, made with wire-gauze sides, and provided with shelves F, made of slats, and with a door, D, substantially as herein shown and described.

SAMUEL INMAN.

Witnesses:
WILLIAM COLLINS,
JOHN CALDOM.